Sept 3, 1957      R. W. BROWN      2,805,388

APPARATUS FOR TESTING CONTACTS

Filed May 27, 1953      4 Sheets-Sheet 1

INVENTOR
R. W. BROWN
BY C. B. Hamilton
ATTORNEY

Sept 3, 1957   R. W. BROWN   2,805,388
APPARATUS FOR TESTING CONTACTS
Filed May 27, 1953   4 Sheets-Sheet 2

INVENTOR
R. W. BROWN
BY C. B. Hamilton
ATTORNEY

Sept 3, 1957 R. W. BROWN 2,805,388
APPARATUS FOR TESTING CONTACTS
Filed May 27, 1953 4 Sheets-Sheet 3

INVENTOR
R. W. BROWN
BY C. B. Hamilton
ATTORNEY

Sept 3, 1957 R. W. BROWN 2,805,388
APPARATUS FOR TESTING CONTACTS
Filed May 27, 1953 4 Sheets-Sheet 4

INVENTOR
R. W. BROWN
BY C. B. Hamilton
ATTORNEY

United States Patent Office 2,805,388
Patented Sept. 3, 1957

2,805,388

APPARATUS FOR TESTING CONTACTS

Raymond W. Brown, Evergreen Park, Ill., assignor to Western Electric Company, Incorporated, New York, N. Y., a corporation of New York Application May 27, 1953, Serial No. 357,875

9 Claims. (Cl. 324—28)

This invention relates to apparatus for testing contacts, and more particularly to apparatus for testing the sequence of operation of a plurality of contacts of a relay.

In the telecommunication arts, multi-contact relays often are used for purposes in which the several contacts of a relay must close in a definite time relationship with respect to one another. In some instances, it is essential that all the contacts be closed simultaneously, while sometimes it is necessary that some close before others or open before others. In the past there has been no apparatus known which would quickly test the operative relationship of several contacts of a relay, one with respect to another.

An object of the invention is to provide new and improved apparatus for testing contacts.

Another object of the invention is to provide new and improved apparatus for testing multi-contact relays.

A further object of the invention is to provide new and improved apparatus for simultaneously testing and indicating the operative conditions of the several contacts of a multi-contact relay.

In an apparatus illustrating certain features of the invention, a plurality of contacts to be tested are actuated and individual horizontal sweep lines are formed on a cathode ray tube, one for each set of contacts, in synchronism with the actuating movement of the contacts. Each set of contacts is so coupled to the cathode ray tube as to deflect vertically the horizontal beam associated with that set of contacts while that set of contacts is closed.

In an apparatus forming a more specific embodiment of the invention, a relay is repeatedly energized and de-energized. As the relay is energized, a beam of light responsive to the movement of the armature of the relay is utilized to cause a horizontal sweep of a cathode ray tube in accordance with the movement of the armature. The sets of contacts of the relay are sequentially connected to the vertical deflection plates in the cathode ray tube during the sequential sweeps of the horizontal beam and the beam is so deflected vertically that for the operation of each set of contacts of the relay, the beam is in a different vertical position. The closing of each set of contacts causes the beam associated therewith to be deflected vertically when the contacts are closed so that the relative time of closing of the contacts with respect to the movement of the armature to the relay is indicated by the vertical deflection of the beam of that contact. This procedure is repeated at a rate of speed sufficient that all of the horizontal beams remain on the cathode ray tube screen so that the relative times of closure of the contacts may be compared.

A complete understanding of the invention may be obtained from the following detailed description of an apparatus forming a specific embodiment thereof, when read in conjunction with the appended drawings, in which—

Figure 1:
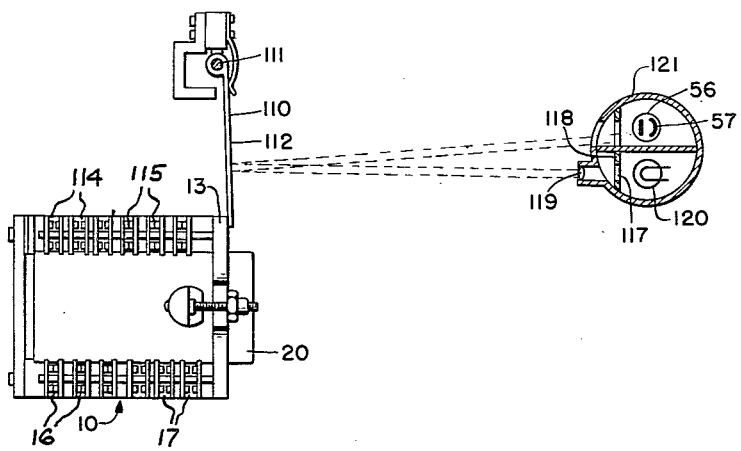
Fig. 1 is a top plan view of a portion of an apparatus forming one embodiment of the invention.
Figure 5:
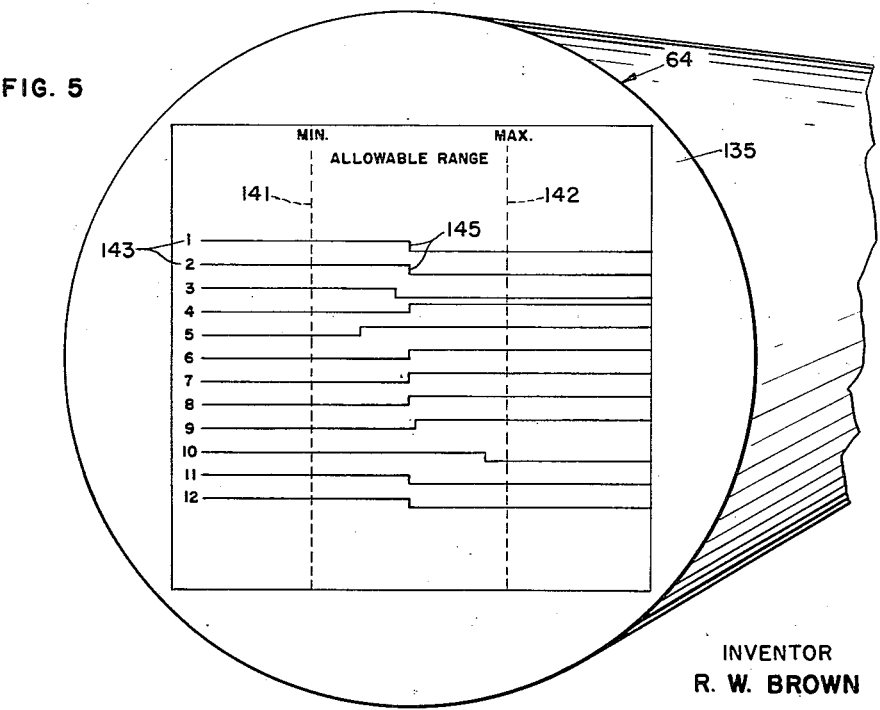
Fig. 5 is an enlarged perspective view of a portion of the apparatus shown in Fig. 1.
Figure 4:
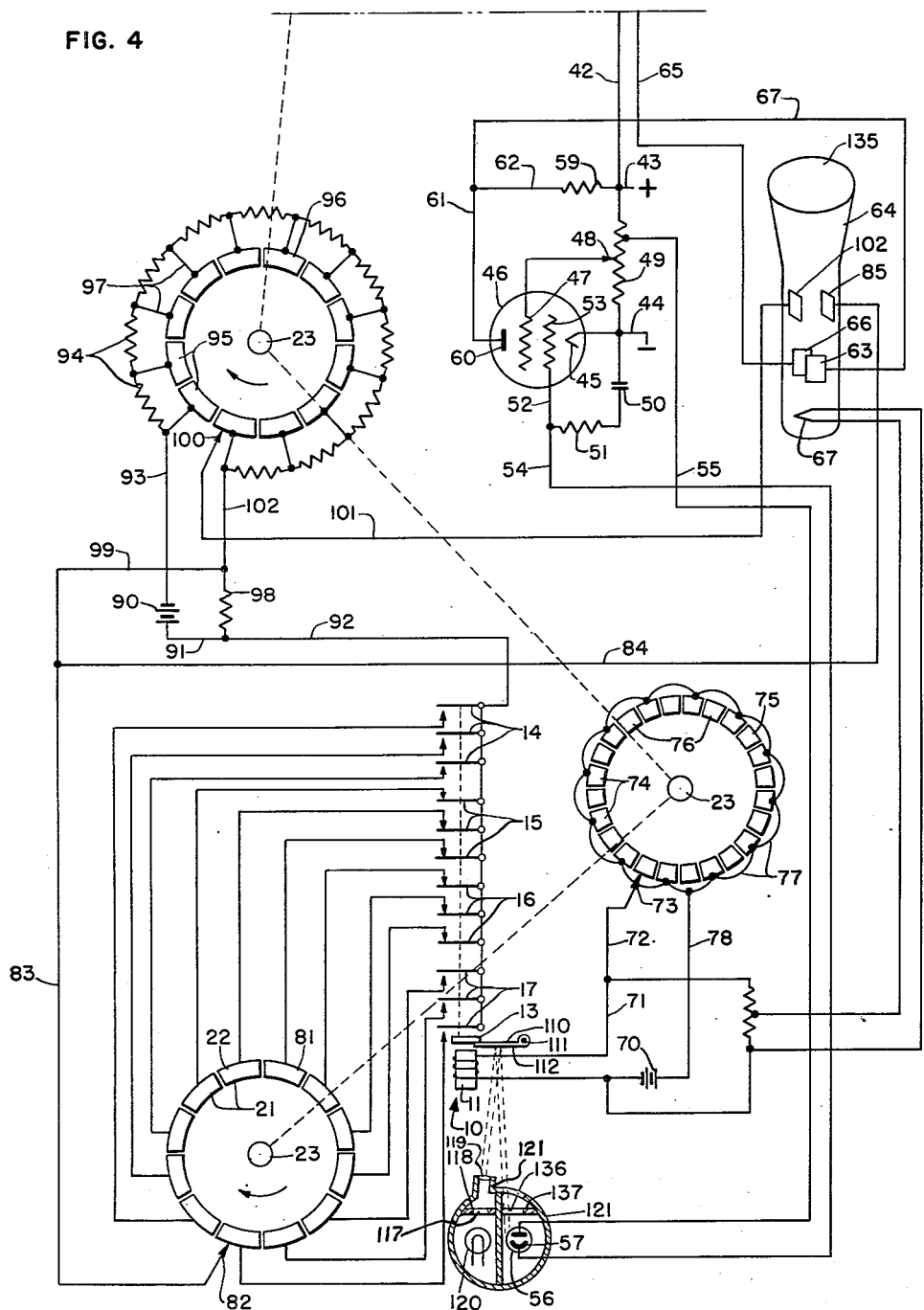
Fig. 4 is a schematic view of another portion of the wiring diagram designed to be fitted to the bottom of the portion thereof shown in Fig. 3 to form a complete circuit.

Referring now in detail to the drawings, there is shown therein an apparatus for testing a relay 10 (Fig. 1) provided with a winding 11, an armature 13 and sets of contacts 14, 15, 16 and 17 (Fig. 4). When the winding 11 is energized, it pulls the armature 13 toward the winding to actuate the sets of contacts 14, 15, 16 and 17. The sets of contacts 14 are normal make contacts of the relay, the sets of contacts 15 are normal break contacts, the sets of contacts 16 are early break contacts and the sets of contacts 17 are early make contacts. Each set of the contacts 14, 15, 16 and 17 is connected by a connector block 20 (Fig. 1), which holds the relay in a predetermined position, to one of segments 21 of a commutator ring 22 mounted on a shaft 23.

Each group of individually operable, manual switches 24, 25, 26 and 27 is equal in number to commutator segments 28 of a commutator ring 29 fixed to the shaft 23, and one side of one switch of each group is connected to one of the commutator segments 28. The other side of switches 25 are connected by a conductor 30 to an adjustable potential divider 31, which is connected in parallel with a battery 32. The other side of each of the switches 26 is connected by a conductor 35 to a potential divider 36 connected in parallel with the battery 32 in parallel with the potential divider 31. The other sides of the switches 27 are connected by a conductor 37 to a potential divider 38 connected in parallel with the dividers 31 and 36 and the battery 32. The other sides of the switches 24 are connected by a conductor 40 directly to the negative side of the potential dividers 31, 36 and 38.

A brush 41 sequentially engages the segments 28 as they are rotated by the shaft 23, and is connected by a conductor 42 to a positive conductor 43 of a direct current powerline also including a negative conductor 44 connected to a cathode 45 of a vacuum tube 46. A screen grid 47 of the tube 46 is connected adjustably by a contactor 48 to a high value resistor 49 connected across the conductors 43 and 44. A condenser 50 and a resistor 51 connect the conductor 44 to a conductor 52 connected to a control grid 53 of the tube 46. A conductor 54 connected to the conductor 52 and a conductor 55 connected to the resistor 49 are connected to a photoelectric cell 56, the conductor 54 being connected to a light receiving electrode 57 of the cell 56. An anode 60 of the tube 46 is connected by conductors 61 and 62 and resistor 59 to the positive conductor 43, and also is connected by the conductor 61 and a conductor 67 to a horizontal deflection plate 63 of a cathode ray tube 64 having a beam-creating electrode 67. A conductor 65 connects the negative side of the battery 32 to a horizontal deflection plate 66 of the tube 64.

The relay winding 11 is connected to a battery 70 through conductors 71, 72, a brush 73 and alternate segment 74 of a commutator 75 rotated by the shaft 23. Dead segments 76 are interposed between the segments 74, which are connected one to another by bridging conductors 77 and are connected continuously to a conductor 78 connected to the battery 70. One side of each of the contacts 14, 15, 16 and 17 is connected to one of the segments 21 of the commutator 22, and as the shaft 23 is rotated a brush 82 contacts the segments 21 one after another. The brush 82 is connected by conductors 83 and 84 to a vertical deflecting plate 85 of the cathode ray tube 64. The contacts 14, 15, 16 and 17 are connected on the other side to one side of a battery 90 by conductors 91 and 92. The other side of the battery 90 is connected by a conductor 93 to one end of a series of resistances 94, which are connected between the junction points thereof to segments 95 of a commutator 96 by conductors 97. The other end of the resistances 94 is connected by a conductor 102 to a resistor 98 and a conductor 99. A brush 100 contacts the segments 95 as they are rotated therearound by the shaft 23, and is connected by a conductor 101 to a vertical deflecting plate 102 of the cathode ray tube 64.

A plate 110 mounted on a pivot 111 is provided with a reflecting surface 112, and is urged continuously against the armature 13. An incandescent lamp 120 projects a band of light through a slot 117 in a mask 118 and a lens 119 of a projector 121 onto the reflecting surface 112. As the armature 13 is moved by the energization of the relay winding 11, the plate 110 is pivoted, thereby deflecting the band of light from the lamp 120 more fully onto the photoelectric cell 56 to actuate the photoelectric cell to initiate, by means of the amplifier circuit including the tube 46, the sweep plates 63 and 66 to cause a beam of electrons to traverse horizontally a long persistent fluorescent screen 135 of the cathode ray tube 64, and causes such a sweep to occur each time the relay winding 11 is energized. As the armature 13 goes through its actuating movement, it impinges the band of light increasingly on the cell 56. Thus, the position of the beam of the tube 64 travels horizontally in accordance with the travel of the armature 13, the quantity of the light on the cell 56 being greater the further along the armature is in its actuating movement until the entire thickness of the band impinges on the photoelectric cell through an aperture 136 in a mask 137.

Figure 2:
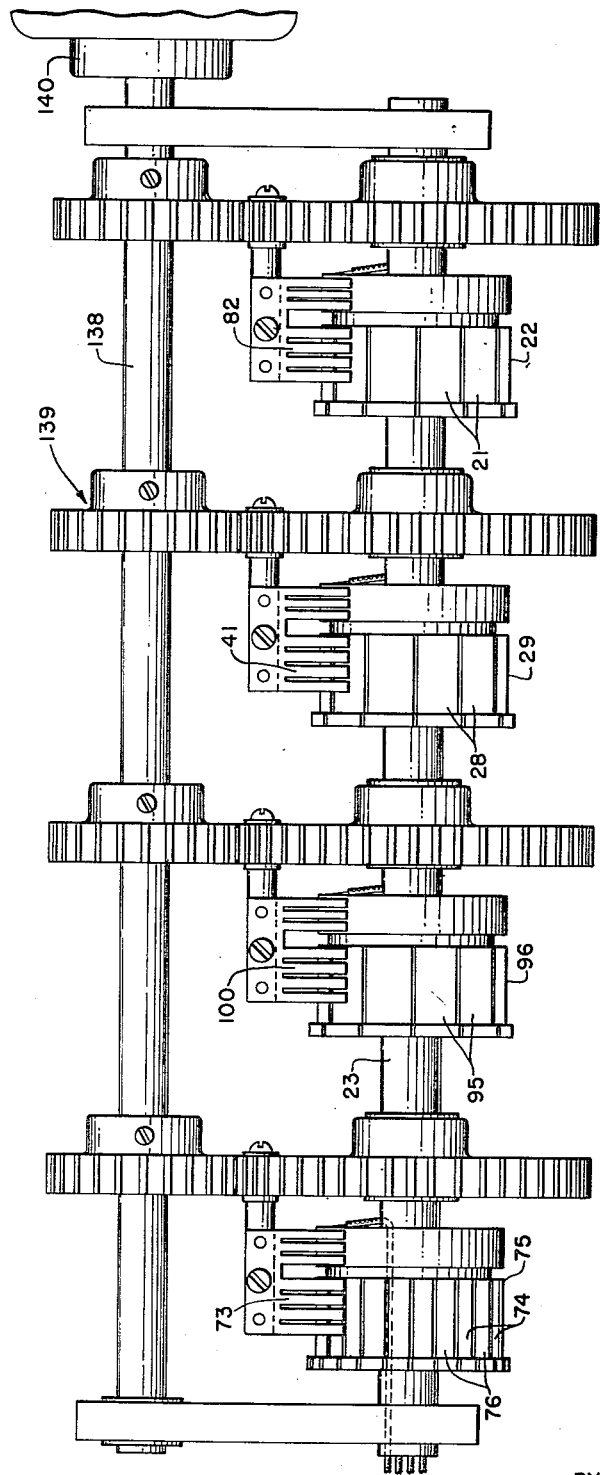
Fig. 2 is a fragmentary, enlarged plan view of a portion of the apparatus shown in Fig. 1.

The relay winding 11 is deenergized each time one of the dead contacts 76 is rotated into engagement with the brush 73, and is energized each time one of the interconnected segments 74 is moved into engagement with the brush 73. The shaft 23 is driven by an electric motor 140 through a shaft 138 and gearing 139 (Fig. 2). The motor 140 runs at a relatively high rate of speed. A motor which has been satisfactory for such use is one rotating at about 3600 revolutions per minute, and rotates the commutators at a correspondingly high rate of speed. The screen 135 has limit lines 141 and 142 marked thereon, and also is provided with numerals 143 indicating the several horizontal sweep lines to identify the sweep lines with the sets of contacts 14, 15, 16 and 17.

*Operation*

Figure 3:
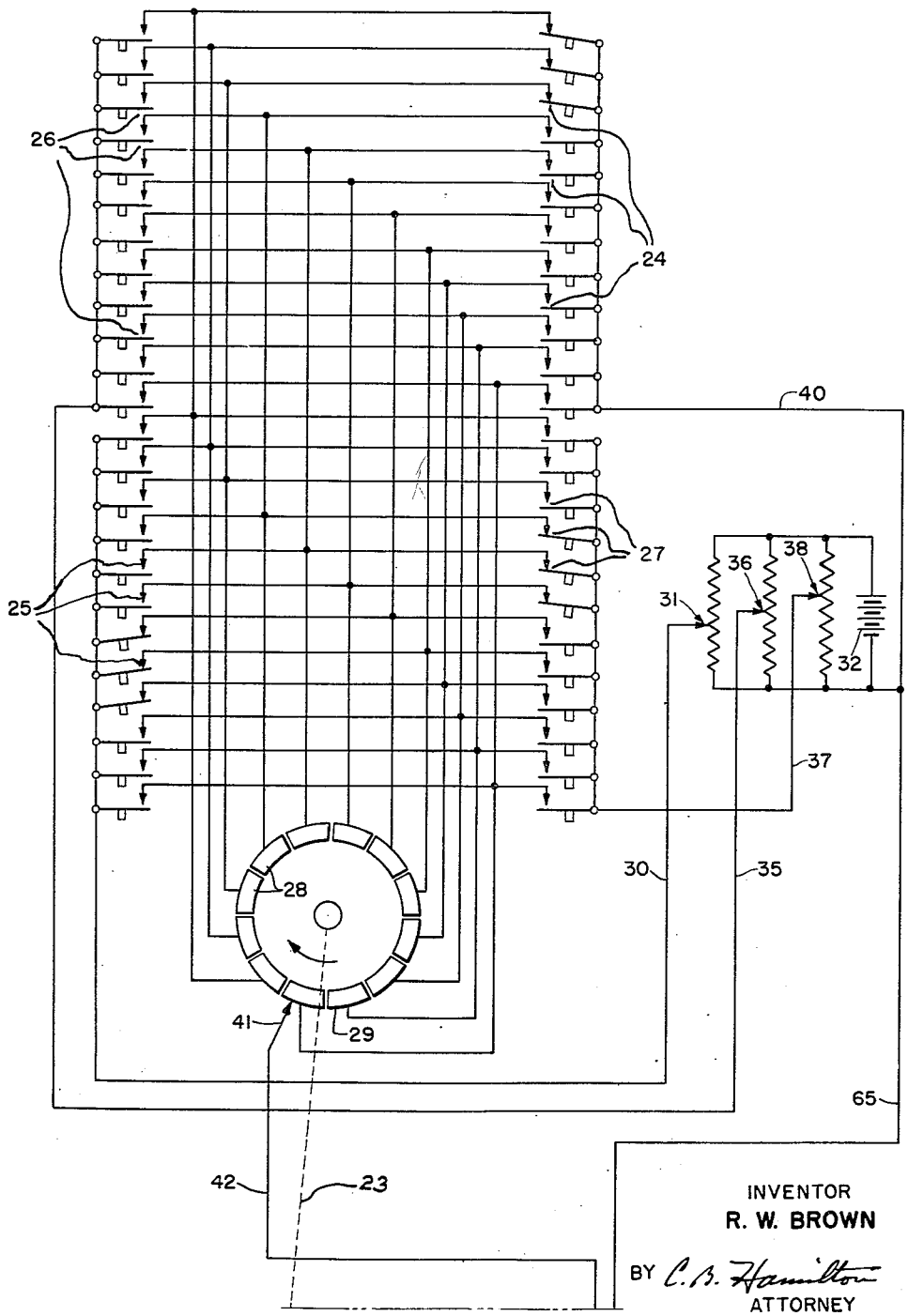
Fig. 3 is a schematic view of a portion of a wiring diagram of the apparatus shown in Fig. 1.

The relay 10 is mounted on the connector block 20, which connects it in the testing circuit as shown on Figs. 3 and 4, and the motor 140 (Fig. 2) is energized to rotate the shaft 23 and the commutators 75, 29, 96 and 22 past the brushes of these commutators. The commutator 75 causes the relay winding 11 to be alternately energized and deenergized. While the relay winding is energized, particular ones of the segments 21, 28 and 95 are being rotated past the brushes 82, 41 and 100, respectively. A predetermined one of the segments 95 is contacted by the brush 100 while a predetermined one of the segments 21 is contacted by the brush 82, and the brush 100 is connected to a predetermined one of the resistors 94 at this time to place a predetermined potential from the battery 90 on the vertical deflection plates 102 and 85; the brush 100 and the resistors 94 acting as a potential divider. As the shaft 23 is rotated so that the brushes 100 and 82 contact succeeding segments, the brush 100 moves to the next resistor 94 to increase the voltage across the plates 85 and 102. This deflects the electron beam of the tube 64 to form the next lower one of the lines 145. Thus, one line 145 is formed for each set of contacts 14, 15, 16 and 17.

The brush 82 connects each set of contacts 14, 15, 16 and 17 successively in shunt with the resistor 98 during each successive closing movement of the armature 13. While one of the contacts so connected is open, the line 145 corresponding thereto is at a predetermined level. However, while that set of contacts is closed, the shunting of the resistor 98 thereby increases the potential on the plates 85 and 102 to deflect the line 145 below the level corresponding to the open condition of the contacts, and the point in the line 145 at which such a deflection occurs, down in the case of the normally open contacts 14 and 17, and up in the case of one set of the normally closed contacts 15 and 16, indicates the change from normal to operated condition.

The position of the deflection of each line 145 indicates the point in the travel of the armature 13 at which the contacts corresponding to that line are operated, and the limit lines 141 and 142 indicate allowable limits. In order that the limit lines 141 and 142 may serve for all types of contacts, the upper three switches 24 are closed to connect the positive conductor 43 directly to the horizontal sweep plate 66 to start and end the lines 145 corresponding to the contacts 14 in a centered relationship on the screen 135, and progressively lower groups of three of the switches 27, 25 and 26 are closed manually. The closed ones of the switches 25, 26 and 27 impress a lower voltage on the plates 63 and 66 through the potential dividers 31, 36 and 38 to start the horizontal sweep of the beam of the tube 64 progressively farther to the right on the screen than occurs when the normal make contacts 14 are coupled to the tube 64. The effect of the shifting of the electron beam by the switches 25, 26 and 27 is to make the limit lines 141 and 142 correct for all the different types of contacts 14, 15, 16 and 17 even though the different contacts, when properly adjusted, make or break at different times.

The above-described apparatus serves to test a plurality of contacts simultaneously and provides a continuous visual indication of each contact so that the contacts may be rapidly adjusted. It also serves to test all different types of contacts.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing the sequence of operation of contacts, which comprises a cathode ray tube including a pair of deflector plates, a pair of sweep plates and a screen, means operable for actuating a set of contacts to be tested, means for energizing the sweep plates as the set of contacts is actuated to sweep the beam of the tube, a plurality of resistances of unequal values each associated with one contact of said set, a direct current voltage source connected to the resistances, means for sequentially connecting the resistances to the deflector plates whereby a plurality of deflection voltages of different values one for each contact are sequentially connected to the deflector plates, and means connected to the voltage source for varying the deflection voltage connected to the deflector plates when the contact associated with that deflection voltage is actuated.

2. An apparatus for testing the sequence of operation of a plurality of contacts, which comprises a cathode ray tube including a pair of deflector plates, a pair of sweep plates and a screen, means for applying progressively different potentials to the deflector plates, each of said different potentials being associated with one contact, means operable in synchronism with the potential-applying means for actuating the plurality of contacts in a sequence to be determined, means for energizing the sweep plates to sweep the beam, and means for varying said different potential applied to the deflector plates to deflect the beam sweep as the condition of the contact associated with said different potential is changed between open and closed.

3. An apparatus for testing the sequence of operation of a plurality of contacts, which comprises a cathode ray tube including a pair of vertical deflector plates, a pair of horizontal sweep plates and a screen, a direct current voltage source, a plurality of stepped resistances connected to the voltage source, each of said stepped resistances being associated with one of the contacts, means for successively connecting the stepped resistances to the deflector plates to successively apply a plurality of stepped deflection voltages one for each contact to the deflector plates, means operable in synchonism with the coupling means for actuating the contacts in a sequence to be determined, means for energizing the sweep plates as the contacts are actuated to sweep the beam in synchronism with the actuating means, and means connected to the voltage source for varying the stepped voltage applied to the deflector plates to deflect the beam vertically as the condition of the contact associated with said stepped voltage is changed between open and closed.

4. An apparatus for testing contacts, which comprises commutator means for periodically energizing and deenergizing a relay to actuate a plurality of sets of contacts of the relay, a cathode ray tube including vertical deflector plates, horizontal sweep plates and a screen, photoelectric means responsive to movement of the contacts as the relay is actuated for energizing the sweep plates to sweep the beam, a plurality of impedances, and commutator means for coupling the resistances and the contacts one at a time with the vertical deflector plates.

5. An apparatus for testing contacts, which comprises commutator means for periodically actuating a relay to actuate a plurality of sets of contacts of the relay, a cathode ray tube including deflector plates, sweep plates and a screen, means responsive to actuating movement of the relay for energizing the sweep plates to sweep the beam of the tube, a variable voltage source coupled to the deflector plates, means for varying the voltage applied to the deflector plates, and means operable in synchronism with the varying means for coupling the sets of contacts sequentially to the deflector plates.

6. An apparatus for testing relay contacts, which comprises a cathode ray tube having a beam-forming element, a long persistent screen, vertical deflector plates and horizontal deflector plates, a voltage source, means for periodically actuating a relay having a plurality of sets of contacts, a potential divider variable in steps, means for coupling the voltage divider and the voltage source to the vertical deflector plates, means for varying the voltage divider in synchronism with the operation of the relay actuating means, commutator means for coupling the sets of contacts sequentially to the vertical deflector plates in synchroism with the divider-varying means so that the beam is deflected vertically as the sets of contacts are changed between open and closed conditions, a plurality of individually operable switches, a potential-applying means, commutator means for coupling the potential-applying means and the switches seriatim to the horizontal deflector plates, a photoelectric cell coupled to the horizontal deflector means, means for projecting a band of light of a predetermined width, and means for impinging the band progressively on the photoelectric cell in accordance with the actuating movement of the relay.

7. An apparatus for testing relay contacts, which comprises a cathode ray tube having a beam-forming element, a long persistent screen, vertical deflector plates and horizontal deflector plates, a voltage source, means for periodically actuating a relay having a plurality of sets of contacts, a potential divider variable in steps, means for coupling the voltage divider and the voltage source to the vertical deflector plates, means for varying the voltage divider in synchronism with the operation of the relay actuating means, means for coupling the sets of contacts sequentially to the vertical deflector plates in synchronism with the divider-varying means so that the beam is deflected vertically as the sets of contacts are changed between open and closed conditions, and means for applying a progressively varying voltage to the horizontal deflector plates in synchronism with the operation of the relay-actuating means.

8. An apparatus for indicating simultaneously variations of a predetermined number of characteristics, which comprises a cathode ray tube having means for forming a beam, means for sweeping the beam and deflector plates for deflecting the beam laterally of its sweep; means for periodically energizing the beam-sweeping means; means for sequentially applying voltages of different values to the deflector plates in such a manner that the beam forms a line for each voltage, each said voltage being associated wtih one of the characteristics, and means operable while each line is being formed by the voltage associated with that line for varying said voltage in response to a variation of the characteristic asssociated with said voltage variation, whereby the characteristics of all the characteristics are shown simultaneously.

9. An apparatus for indicating simultaneously variations in a plurality of characteristics, which comprises a cathode ray tube having sweep plates and deflector plates, said tube also havtng beam-forming means and a screen, means for periodically energizing the sweep plates to sweep the beam across the screen on each such energization, means for deflecting the beam laterally after each sweep in such a manner as to form a line for each characteristic, a plurality of signal circuits responsive to variations in the characteristics for deflecting the beam laterally of its sweep during said sweep, one for each characteristic, and means for connecting each signal circuit to the deflector plates during the formation of the line representing the characteristic with which said signal circuit is associated.

References Cited in the file of this patent

UNITED STATES PATENTS

| | | |
|---|---|---|
| 2,154,379 | Eastes | Apr. 11, 1939 |
| 2,171,216 | Koch | Aug. 29, 1939 |
| 2,432,944 | Shillington | Dec. 16, 1947 |